(12) United States Patent
Matsuda et al.

(10) Patent No.: US 7,735,887 B2
(45) Date of Patent: Jun. 15, 2010

(54) ROBOT HAND APPARATUS

(75) Inventors: Hiroshi Matsuda, Saitama (JP);
Takafumi Fukushima, Saitama (JP);
Kenichiro Sugiyama, Saitama (JP);
Masayoshi Kokushiyou, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 1094 days.

(21) Appl. No.: 10/576,190

(22) PCT Filed: Sep. 29, 2005

(86) PCT No.: PCT/JP2005/017974

§ 371 (c)(1),
(2), (4) Date: Apr. 17, 2006

(87) PCT Pub. No.: WO2006/064603

PCT Pub. Date: Jun. 22, 2006

(65) Prior Publication Data

US 2009/0016851 A1 Jan. 15, 2009

(30) Foreign Application Priority Data

Dec. 14, 2004 (JP) ............................. 2004-361550

(51) Int. Cl.
*B25J 15/08* (2006.01)
(52) U.S. Cl. ............................. 294/106; 901/36; 901/39
(58) Field of Classification Search ................ 294/106; 901/36, 38, 39; 414/1, 4–6; 623/64
See application file for complete search history.

(56) References Cited

U.S. PATENT DOCUMENTS

| 2,553,827 A | * | 5/1951 | Mason | 623/64 |
| 2,669,727 A | * | 2/1954 | Opuszenski | 623/64 |
| 3,694,021 A | * | 9/1972 | Mullen | 294/106 |

(Continued)

FOREIGN PATENT DOCUMENTS

JP  11-156778  6/1999

(Continued)

OTHER PUBLICATIONS

European Search Report PCT/JP2005017974 dated Dec. 21, 2007.

*Primary Examiner*—Dean J Kramer
(74) *Attorney, Agent, or Firm*—Squire, Sanders & Dempsey L.L.P.

(57) ABSTRACT

A robot hand apparatus (1) includes a base (2); a motor (M); a first-link (10) supported by the base (2) while allowing the rotation around a first axis (S1), which is in parallel to an actuation axis (G) of the motor (M) and is positioned apart from the actuation axis (G), the first-link (10) has a first guide path (11b) movably supporting a control axis (42); a second link (20) which connects with the actuation axis (G) and supports the control axis (42), and moves the control axis (42) within the first guide path (11b) in accordance with the rotation of the actuation axis (G); and a finger link (F1) supported by the first link (10) while allowing the rotation around a second axis; and the finger link (F1) directly or indirectly links with the control axis (42) and is rotated by the actuation of the control axis (42).

10 Claims, 9 Drawing Sheets

U.S. PATENT DOCUMENTS

| | | | | |
|---|---|---|---|---|
| 4,246,661 A | * | 1/1981 | Pinson | 623/25 |
| 4,364,593 A | | 12/1982 | Maeda | |
| 4,921,293 A | * | 5/1990 | Ruoff et al. | 294/111 |
| 4,955,918 A | * | 9/1990 | Lee | 623/24 |
| 5,447,403 A | * | 9/1995 | Engler, Jr. | 414/4 |
| 7,222,904 B2 | * | 5/2007 | Matsuda | 294/111 |

FOREIGN PATENT DOCUMENTS

| | | |
|---|---|---|
| JP | 2001-277175 | 10/2001 |
| JP | 2001-347482 | 12/2001 |
| JP | 2003-117873 | 4/2003 |
| JP | 2003-181787 | 7/2003 |
| JP | 2004-174625 | 6/2004 |

\* cited by examiner

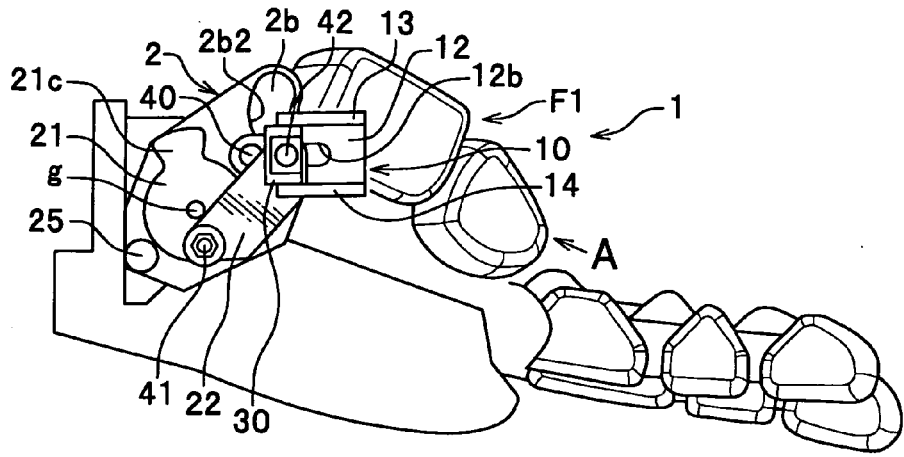
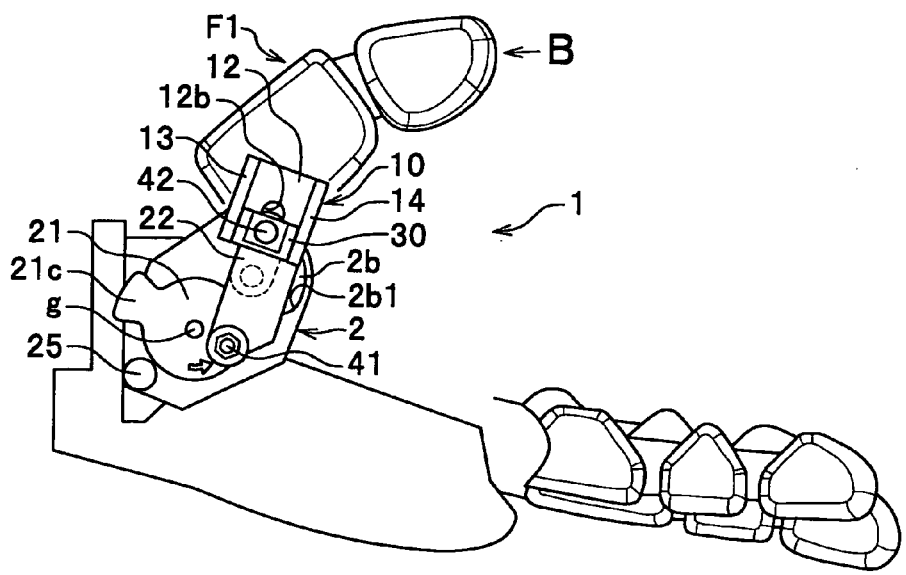
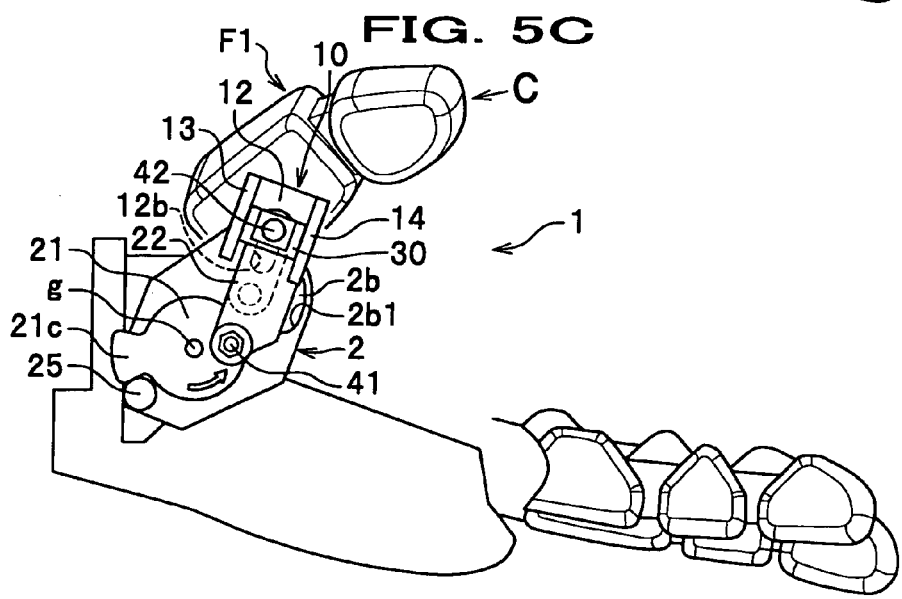

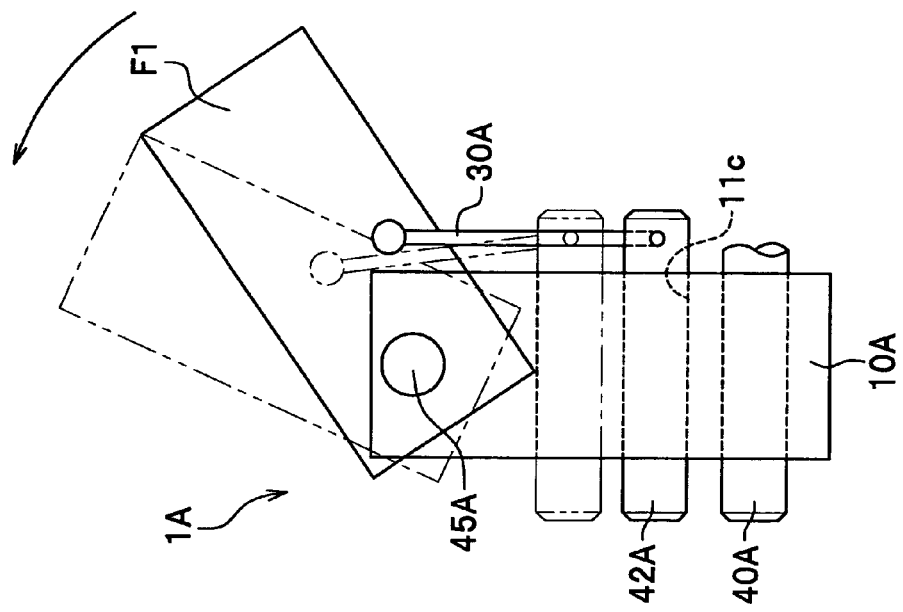
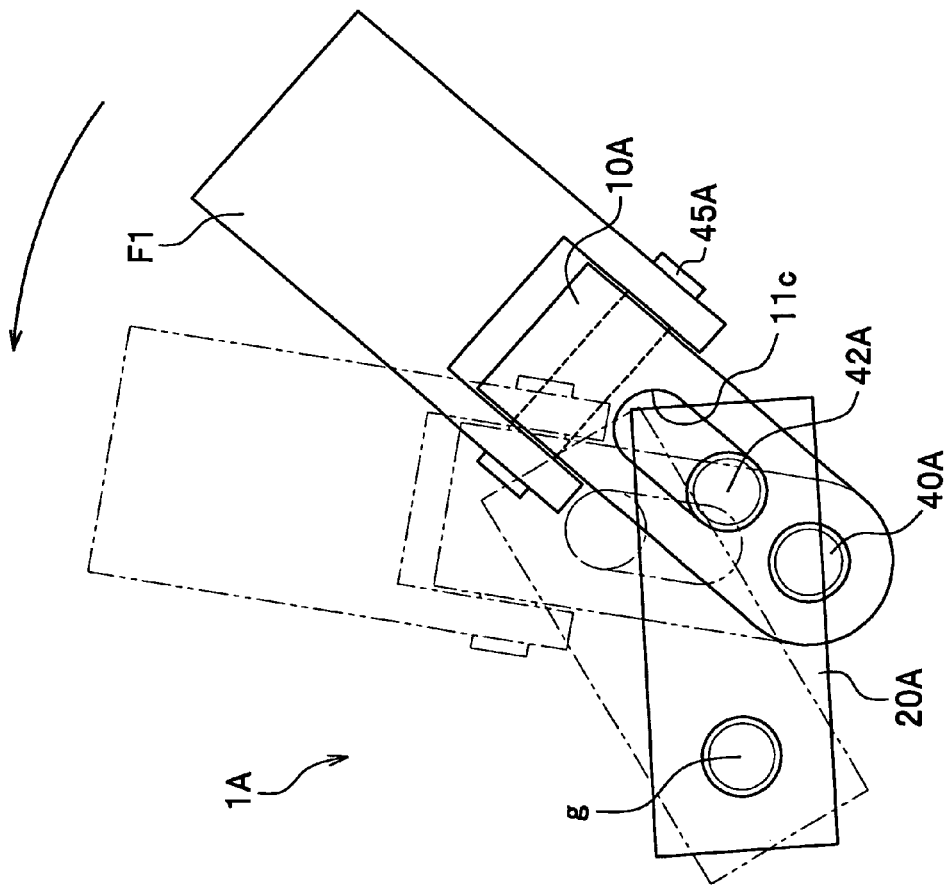

ROBOT HAND APPARATUS

FIELD OF THE INVENTION

The present invention relates to a robot hand apparatus which can actuate a finger around two cross-axes crossing each other.

BACKGROUND OF THE INVENTION

Conventionally, a research and development of a robot hand apparatus mimicking a hand of a human has been made to make the robot to do various kinds of tasks.

For representing the function of a thumb among five fingers of a human, for example, two crossing axes are required, if it is assumed a palm is facing upside (see Japanese unexamined patent publication JP No. 2003-117873). Here, one of two crossing axes is an axis for rotating a thumb in a height direction, and the other of two crossing axes is an axis for rotating the thumb in a left-and-right direction.

In the conventional robot hand apparatus, however, a total of two sets, each consisting of a motor, a reduction unit, and a motor driver, are required for each axis, for actuating the finger around two crossing axes. In this case, since the number of the parts and the weight of the robot hand apparatus are increased, this becomes the defect for a humanoid-type robot restricted in a volume and an output.

Therefore, the robot hand apparatus which can actuate a finger around two crossing axes with simple mechanism has been required.

SUMMARY OF THE INVENTION

The present invention relates to a robot hand apparatus, which has a base, a motor, a first-link, a second link, and a finger link. In this robot hand apparatus, the motor is fixed to the base, and the first-link is supported by the base while allowing the rotation around a first axis, and has a first guide path in which a control axis is movable. Here, the first axis is an axis in parallel to an actuation axis of the motor and is positioned apart from the actuation axis.

The second link connects with the actuation axis of the motor and supports the control axis. The second link moves the control axis within the first guide path in accordance with the rotation of the actuation axis of the motor, and the finger link is supported by the first link while allowing the rotation around a second axis crossing the first axis. The finger link directly or indirectly links with the control axis so that the finger link is rotated around the second axis in accordance with the actuation of the control axis.

According to this robot hand apparatus, since finger link can be rotated around two crossing axes using a single motor, the motor, the reduction unit, and the motor driver are not required for each axis.

In this robot hand apparatus, for example, it is preferable that the base has a second guide path within the moveable range of the first guide path, and the second link includes a rotator, which is fixed to the actuation axis, and a connection link, which is rotatably supported by the rotator and supports the control axis.

According to this construction, the first link and the finger link can be actuated separately. For example, the finger link can be actuated after the actuation of the first link.

Furthermore, it is preferable that the second guide path is formed by connecting a first guide hole and a second guide hole. In this case it is preferable that the first guide hole is formed by elongating in a circumference direction around the first axis, and that the first guide hole guides the control axis in a circumference direction around the first axis. It is still more preferable that the second guide hole is formed by elongating in a radial direction with respect to the first axis, and that the second guide hole guides the first axis in a radial direction.

According to this construction, the first link can be actuated around first axis by the first guide hole, and the finger link can be actuated around the second axis by the second guide hole.

Still furthermore, it is preferable that the control axis is adapted to slide within the first guide hole and the second guide hole.

According to this construction, the finger link can be actuated smoothly and constantly on a constant locus.

According to the present invention, since the finger link can be actuated around two axes using a simple mechanism, the reduction of the number of the parts can be achieved. Thus, since the reduction in a volume and weight of the mechanism of the robot hand apparatus can be enabled, the robot hand apparatus of the present invention is suitable for the use in a humanoid-type robot.

BRIEF DESCRIPTION OF THE DRAWINGS

FIG. 5A is an explanatory view showing the robot hand apparatus, which is looked from the direction V in FIG. 3, and in which the finger is in a flexed-position.

FIG. 5B is an explanatory view showing the robot hand apparatus, which is looked from the direction V in FIG. 3, and in which the finger is positioned between flexed-position and stretched-position.

FIG. 5C is an explanatory view showing the robot hand apparatus, which is looked from the direction V in FIG. 3, and in which the finger is in a stretched-position.

FIG. 9A is a plane view showing the motion around the first axis of the robot hand apparatus with simple second link.

FIG. 9B is a plane view showing the motion around the second axis of the robot hand apparatus with simple second link.

DETAILED DESCRIPTION OF THE PREFERRED EMBODIMENT

The robot hand apparatus 1 of the present embodiment relates to the construction about the finger which corresponds to a thumb of a human. In this embodiment, the robot hand apparatus 1 is provided to each arm R3. But, in the following explanation, the explanation is carried out about the robot hand apparatus 1 installed on the right hand, and the explanation about that of installed on the left hand will be omitted. This is because the left hand is symmetrical with respect to the right hand.

Figure 1:
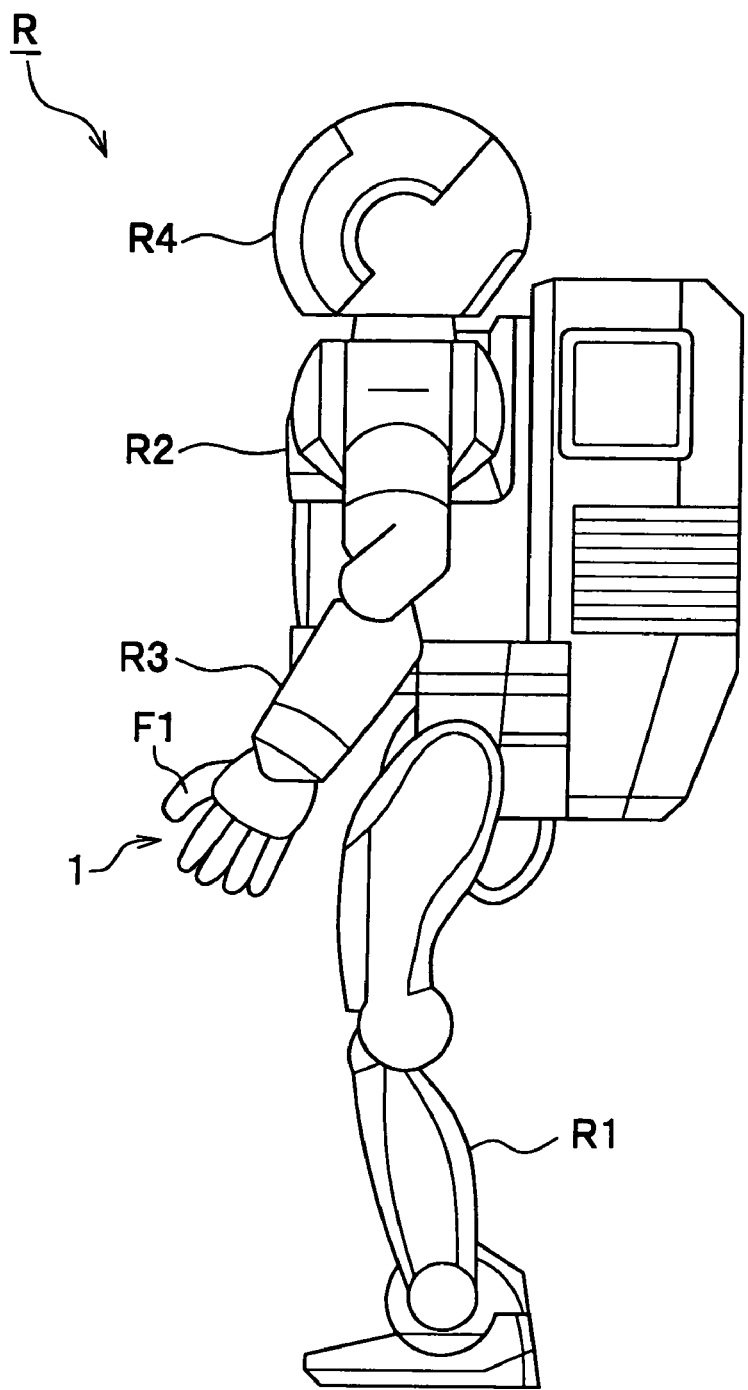
FIG. 1 is an outside view of a humanoid-type robot equipped with the robot hand apparatus of the present embodiment.

As shown in FIG. 1, the robot hand apparatus 1 of the present embodiment is provided at an end of the arm R3 of a bipedal waling robot R. This robot R has two legs R1, a body R2, two arms R3, and a head R4, like a human. In this figure, the leg R1 and arm R3 disposed on a right side of the robot R is not shown. Additionally, the head R4 has cameras, microphone, and speaker, which are omitted in this figure.

Figure 2:
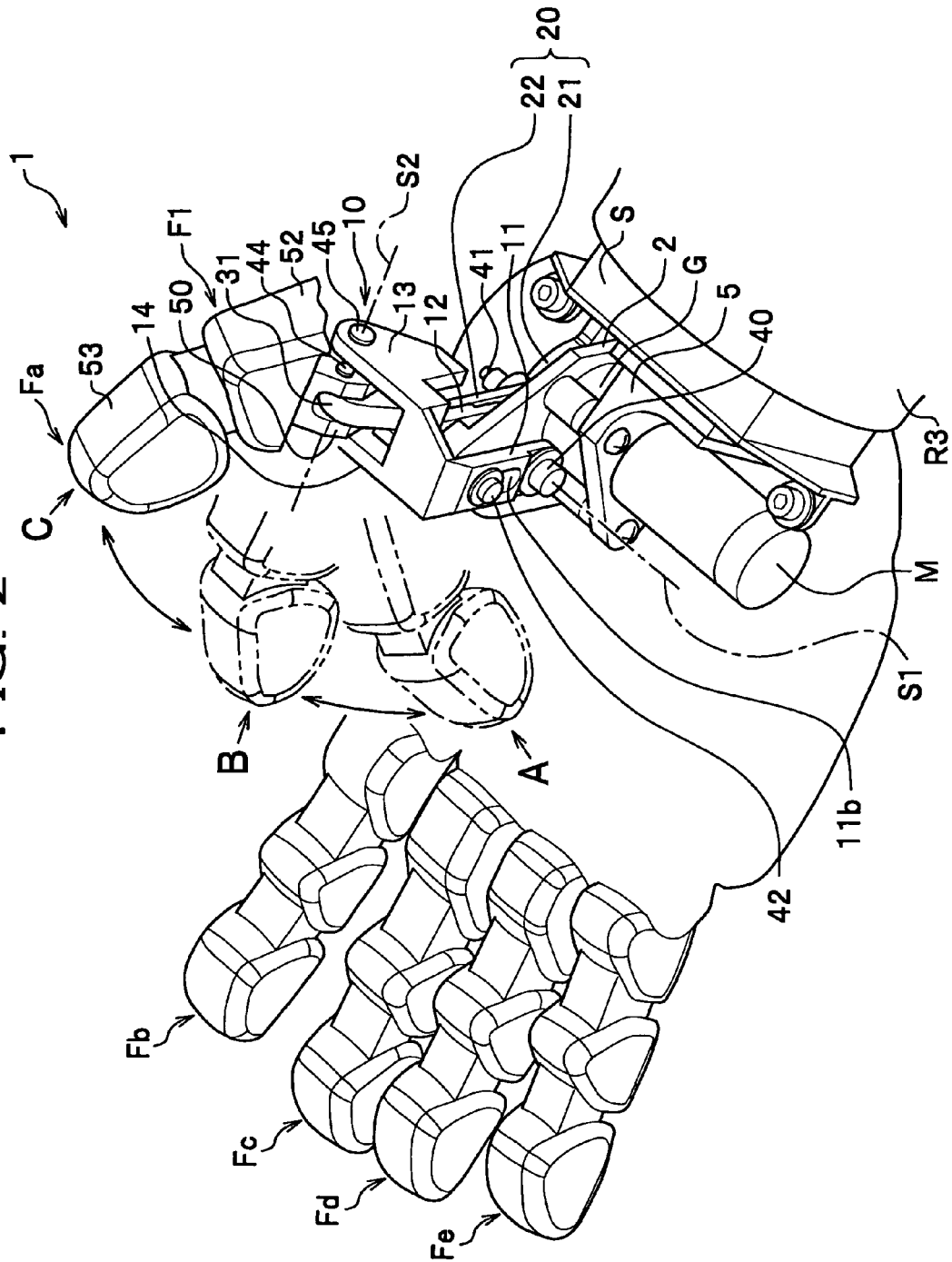
FIG. 2 is a perspective view showing an internal construction and motion flow of the robot hand apparatus.

As shown in FIG. 2, the robot hand apparatus 1 has a five fingers Fa, Fb, Fc, Fd, and Fe, like a human. A finger link F1 is installed on the finger Fa, which corresponds to a thumb of a human, and is allowed to change the posture between posture A, posture C, and posture B. In this FIG. 2, the posture A and posture B are respectively indicated using a dot dash line.

Figure 3:
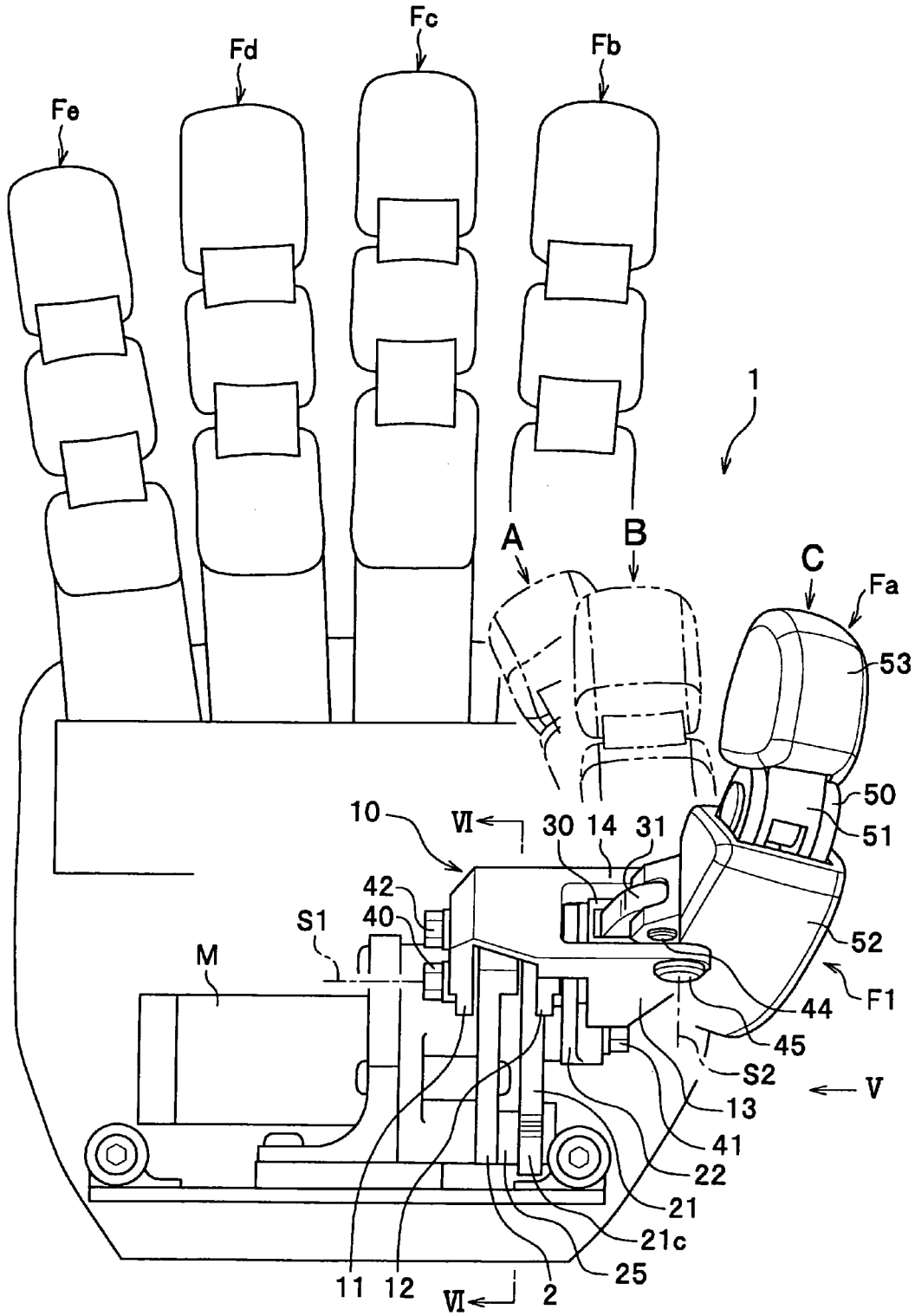
FIG. 3 is a plane view showing an internal construction and motion flow of the robot hand apparatus.

To be more precise, as shown in FIG. 3 and FIG. 5A, the posture A is the condition where the finger link F1 is flexed inside and is in the vicinity of the palm section. As shown in FIG. 3 and FIG. 5B, the posture B is the condition where the finger link F1 is flexed inside and is separated from the palm section. As shown in FIG. 3, the posture C is the condition where the finger link F1 is stretched and is in the outside than the posture B.

Similar to a hand of a human, additionally, each of the remaining fingers Fb-Fe is provided with a first joint and a second joint and is actuated by other motor (not shown) and a link mechanism so as to change the posture between a stretched posture and a hunched posture. Here, the case where each of the fingers Fb-Fe is in a stretched posture is shown in FIG. 2.

Figure 4:
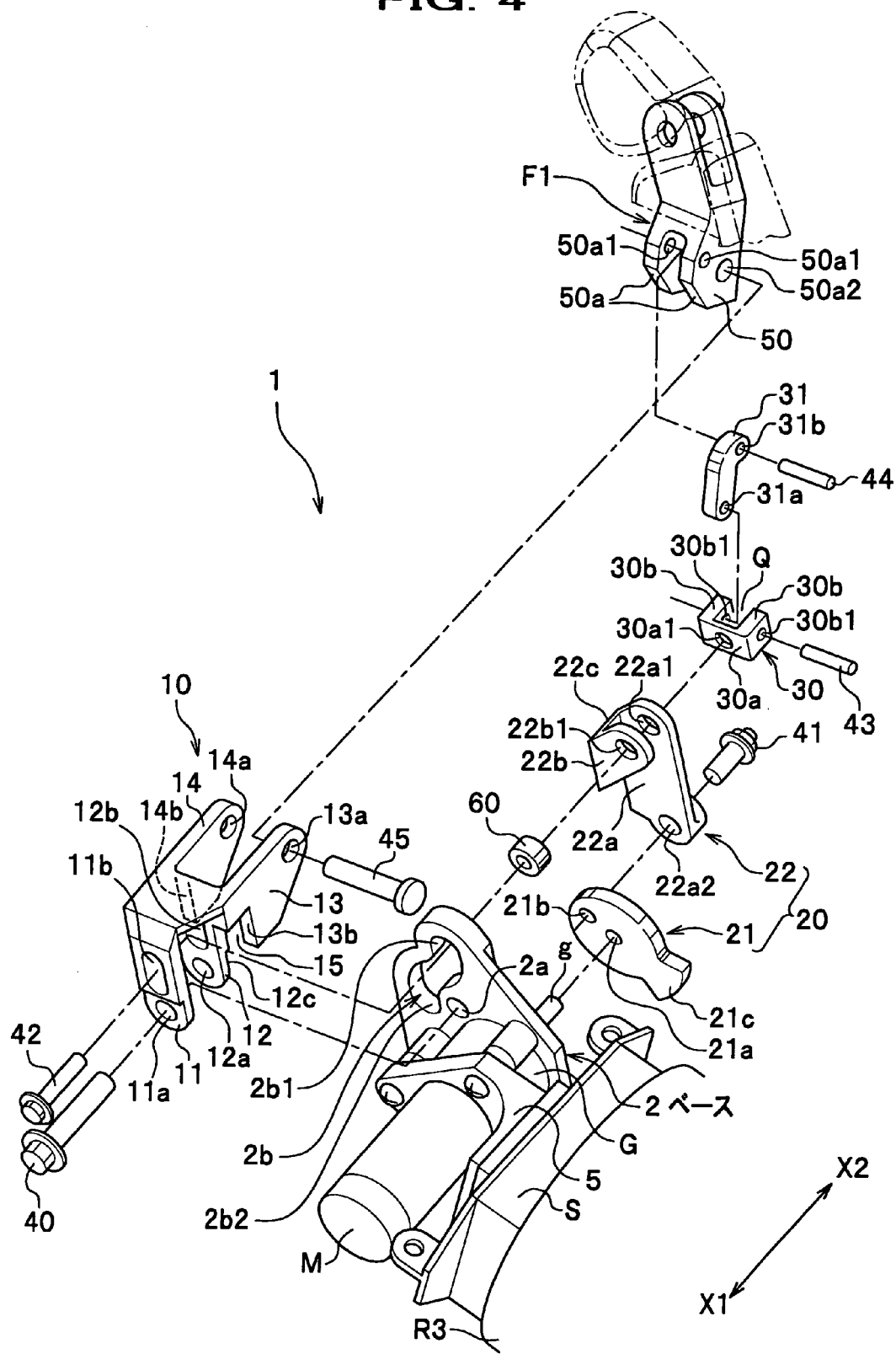
FIG. 4 is an exploded perspective view of the robot hand apparatus.

As shown in FIG. 4, the robot hand apparatus 1 has the finger link F1, a motor M, a first link 10, and a second link 20.

Figure 7:
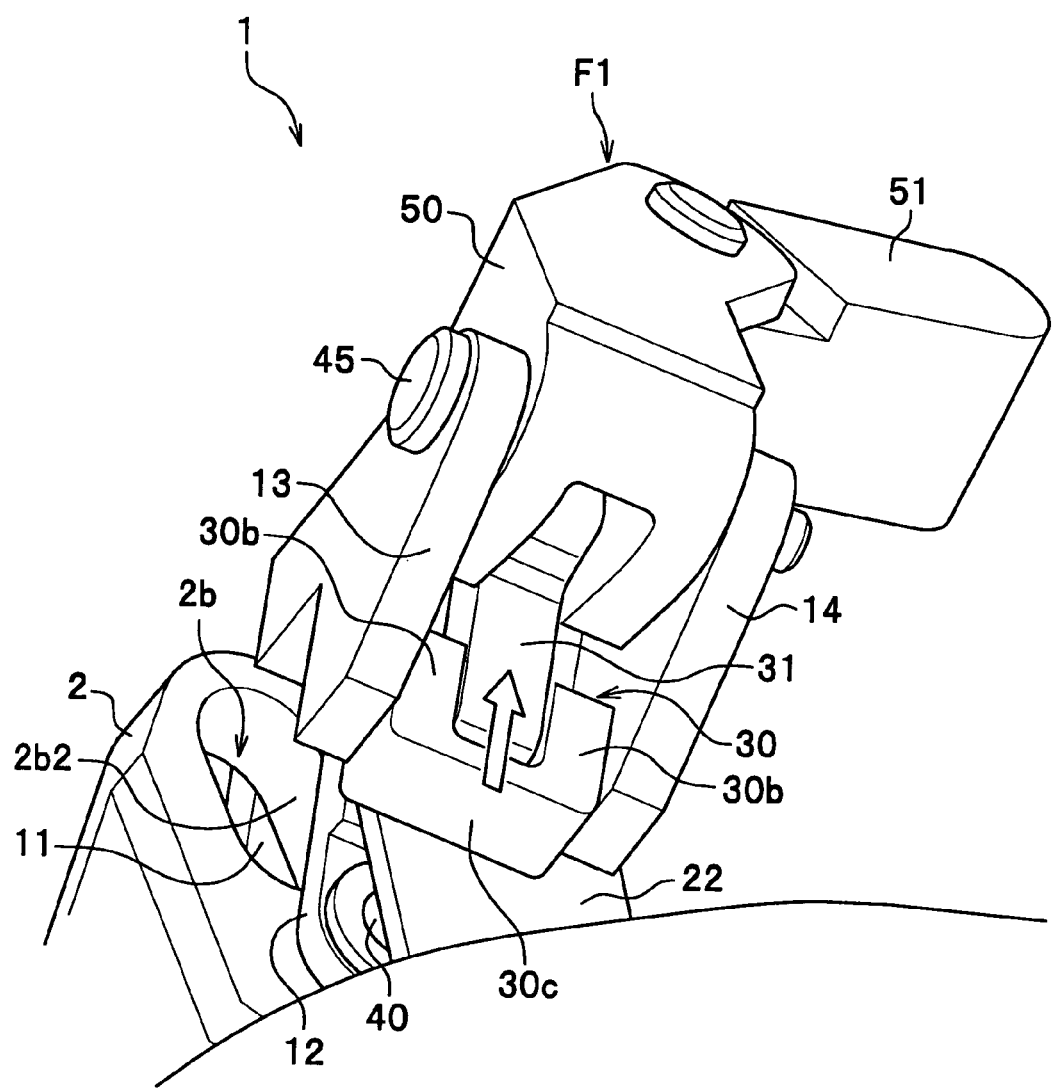
FIG. 7 is a perspective view of the robot hand apparatus which is looked up from an opisthenar-side.

The finger link F1 of the present embodiment, as shown in FIG. 3 and FIG. 7, consists of a finger base 50, a finger tip 51, a cover 52, and a cover 53. The finger tip 51 rotatably connects with the tip of the finger base 50. The cover 52 and the cover 53 cover the periphery of the finger base 50 and the finger tip 51, respectively, and has a shape of a finger (see FIG. 3).

As shown in FIG. 4, the motor M is fixed to a base 2, which is a plate-like shaped member, through a reduction unit G. This base 2 is fixed to a base stage S provided on a wrist of the arm R3.

In the present embodiment, additionally, a motor base 5, to which the motor M is fixed, is fixed to the base stage S, and the reduction unit G is fixed to the base 2 and motor base 5 through a screw. The motor M is fixed to the region in a direction X1 side of the base 2, and an actuation shaft g, which connects with an output shaft (not shown) of the motor M through the reduction unit G, elongates in a direction X2 side.

Furthermore, a rotation hole 2a and a second guide path 2b, each penetrates in a direction parallel to the line X1-X2, are provided on the base 2. The position where the second guide path 2b is provided is in the vicinity of the rotation hole 2a. In this embodiment, the line X1-X2 is in parallel to the output shaft of the motor M.

The second guide path 2b comprises a second guide hole 2b2, which is a curved hole elongating in a circumference direction around the rotation hole 2a, and a first guide hole 2b1, which is a straight long hole elongating in a radial direction. The second guide path 2b is formed by joining the first guide hole 2b1 and the second guide hole 2b2.

The first link 10 is obtained by combining into an integral body a pair of legs 11 and 12 and a pair of guide plates 13 and 14.

Each of legs 11 and 12 is disposed in parallel to the base 2 and each of legs 11 and 12 is an elongated plate. The base end of the leg 11 and 12 is provided with a hole 11a and 12a and a guide long hole (a first guide path) 11b and 12b respectively. A predetermined interval is provided between the hole 11a (12a) and the guide long hole 11b (12b).

Additionally, the leg 11 and 12 are disposed in parallel in a direction along the line X1-X2. The guide plate 13 and 14, each is a trapezoidal shaped plate member, is disposed in parallel with a predetermined interval in a direction orthogonal to the leg 11 and 12 (or the base 2).

A connection hole 13a and 14a is formed at a corner in an direction X2 side of the guide plate 13 and 14. A clearance 15 with a predetermined width is formed between the side-surface 12c of leg 12 and the edge 13b and 14b of the guide plate 13 and 14.

The second link 20 consists of a rotator 21 and a connection link 22. The rotator 21 is a disk-like shaped member and is disposed in parallel to the base 2. A driven hole 21a which serves as a rotation center, and a connection hole 21b are formed on the rotator 21. Here, the position where the connection hole 21b is formed is the eccentric position with respect to the driven hole 21a. Additionally, a protrusion 21c having a sector shape is provided on the rotator 21 and is formed into an integral shape with the rotator 21. The position where the protrusion 21c is provided is the position opposite across the driven hole 21a with regard to the connection hole 21b.

The connection link 22 has a long link plate 22a, which has a through hole 22a1 at one end thereof and has a connection hole 22a2 at the other end thereof, and a short link plate 22b, which has a through hole 22b1 being coaxial with respect to the through hole 22a1.

The long link plate 22a and the short link plate 22b are disposed in parallel in a direction along the line X1-X2 by the connection plate 22c so that a predetermined interval is secured therebetween.

A elevating member 30 is provided on the connection link 22. The elevating member 30 has a side plate 30a, which faces a direction along the line X1-X2, a pair of side plates 30b and 30b orthogonal to the side plate 30a, and a bottom plate 30c (see FIG. 7). A rectangular shaped space Q is formed inside of the elevating member 30. The side plate 30a is provided with a connection hole 30a1, and the side plate 30b and 30b is provided with a pin connection hole 30b1 and 30b1. Here, the distance between side plates 30b of the elevating member 30 is established so that the elevating member 30 can slide between the guide plate 13 and the guide plate 14.

An arm member 31 is provided to the elevating member 30. The width of the arm member 31 is established so that the arm member 31 can be inserted between the side plates 30b and 30b, and one end of the arm member 31 is curved to a direction X2 side. The arm member 31 is provided with pin holes 31a and 31b, which are in parallel to the pin connection hole 30b1, at base end and tip thereof.

The finger base 50 which constitutes a part of the finger link F1 has a pair of connection sections 50a and 50a. The connection sections 50a and 50a are disposed with an interval therebetween so that the insertion to this interval of the arm member 31 is enabled.

Each connection section 50a is provided with a pin connection hole 50a1 which is in parallel to the pin hole 31b, and a connection hole 50a2 which is in parallel to the connection hole 13a and 14a is provided in the vicinity of the pin connection hole 50a1. Here, the connection hole 50a2 disposed on one of the connection sections 50a is not shown in FIG. 4.

In the present embodiment, additionally, a bearing 60 which can slide within the second guide path 2b is provided. The bearing 60 is obtained by sandwiching a plurality of balls, which are aligned along a periphery direction while allowing the rotation, between an inside ring (not shown) and an outside ring (not shown). The bearing 60 is adapted to move the inside of the second guide path 2b while keeping the contact between the circumference thereof with the inside circumference of the second guide path 2b. In the present embodiment, dropout prevention means (not shown) is provided on a control axis 42 or the base 2 for preventing the dropout of the bearing 60 from the second guide path 2b.

Next, the assembling of the present embodiment's robot hand apparatus 1 will be explained.

As shown in FIG. 4, the first link 10 connects with the base 2 through a rigid axis 40. That is, after disposing the first link 10 so that the base 2 is positioned between the leg 11 and the leg 12, the rigid axis 40 is inserted from a direction X1 side in order of: the hole 11a, the rotation hole 2a, and the hole 12a. Thereby, the first link 10 connects with the base 2 while allowing the rotation around the rigid axis 40.

Here, the rotation center of the first link 10 serves as a first axis S1 (see FIG. 2 and FIG. 3).

Then, the driven hole 21a of the rotator 21 is fixed to the actuation shaft g of the motor M, and the connection hole 22a2 of the connection link 22 is connected to the connection hole 21b of the rotator 21 through the link axis 41. Thereby, the connection link 22 becomes rotatable with respect to the rotator 21.

Next, after disposing the connection link 22 so that leg 12 is positioned between the long link plate 22a and the short link plate 22b, which are provided to the connection link 22, the first link 10 and the second link 20 are connected each other by the control axis 42.

That is, after disposing the long link plate 22a within the clearance 15 between the leg 12 and the guide plates 13 and 14, and disposing the short link plate 22b between the leg 12 and base 2, which is positioned between legs 11 and 12, the control axis 42 is inserted from a direction X1 side in order of: guide long hole 11b of the leg 11, the second guide path 2b of the base 2, the bearing 60, the through hole 22b1 of the short link plate 22b1, the long hole 12b of the leg 12, the through hole 22a1 of the long link plate 22a, and the connection hole 30a1 of the elevating member 30. Thus, the first link 10 and the connection link 22 of the second link 20 are joined each other.

Thereby, the control axis 42 is guided by long holes 11b and 12b and the second guide path 2b, and the elevating member 30 moves between the guide plate 13 and the guide plate 14 while rotating with respect to the connection link 22.

Then, the a pin 43 is inserted into the pin connection hole 30b1 and 30b1 of the elevating member 30 and the pin hole 31a of the arm member 31, under the condition the base end of the arm member 31 is inserted into the space Q of the elevating member 30. Thereby, the arm member 31 rotatably connects with the elevating member 30.

Additionally, a pin 44 is inserted into the pin hole 31b of the arm member 31 and the pin connection hole 50a1 and 50a1 of the connection section 50a and 50a, under the condition the tip of the arm member 31 is inserted between the connection sections 50a and 50a of the finger link F1. Thereby, the arm member 31 is rotatably connects with the finger link F1.

Furthermore, a connection pin 45 is inserted into the connection hole 50a2 and 50a2 one of them is not shown of connection section 50a and 50a and connection hole 13a and 14a of the guide plate 13 and 14, under the condition the connection section 50a and 50a of the finger link F1 is inserted between the guide plates 13 and 14 of the first link 10. Thereby, the finger link F1 rotatably connects with the first link 10.

Next, the motion of the robot hand apparatus 1 of the present embodiment will be explained mainly with reference to FIG. 5 and FIG. 6, and appropriately with reference to other drawings.

In the robot hand apparatus 1 of the present embodiment, as described above, the finger link F1 changes the posture between posture A, posture C, and posture B, under the condition where the palm section is facing an upside. Here, the posture A is the condition where the finger link F1 is flexed inside and is in the vicinity of the palm section. The posture B is the condition where the finger link F1 was rotated, from posture A, around the first axis S1 (see FIG. 2 and FIG. 3) to an upper direction separating from the palm section. The posture C is the condition where the finger link F1 was rotated, from posture B, around the second axis S2 to the outside.

In the present embodiment, additionally, the finger link F1 slightly turns outside around the second axis S2 (see FIG. 2 and FIG. 3), during the change of the posture from posture A to posture B. Here, in FIGS. 5A to 5C, the indication of the arm member 31 to be connected to the elevating member 30, the finger base 50 to be connected to this arm member 31, and the finger tip 51 is omitted.

Figure 6A:
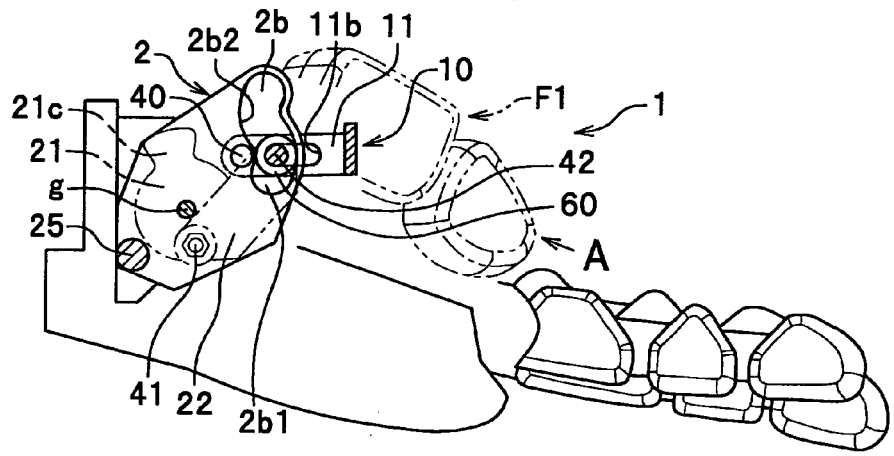
FIG. 6A is an explanatory view showing the robot hand apparatus, which is looked from the cross-section along line VI-VI in FIG. 3, and in which the finger is in a flexed-position.

The posture A shown in FIG. 5A is the condition where the rotator 21 was fully rotated in a clockwise direction around the actuation shaft g. As shown in FIG. 6A, the control axis 42 is positioned within the first guide hole 2b1 of the second guide path 2b, and is in the vicinity of a base side (a rigid axis 40 side) of the guide long hole 11b of the leg 11.

Here, though the guide long hole 12b of the leg 12 is not shown in this figure, the control axis 42 is positioned in the guide long hole 12b at almost the same position as the position within the guide long hole 11b of the control axis 42. Thereby, the first link 10 rotates in a clockwise direction around the rigid axis 40 which serves as the first axis S1 as the supporting point.

As shown in FIG. 5A, the finger link F1 is flexed in compliance with the flexing of the first link 10. Additionally, due to the flexing of the first link 10, the elevating member 30 sandwiched between guide plates 13 and 14 turns in a clockwise direction around the control axis 42, which serves as the supporting point, together with the first link 10, and thus the elevating member 30 is positioned at the end (rigid axis 40 side) of the guide pate 13 and 14.

In the condition of posture A of FIG. 5A and FIG. 6A, the connection link 22 begins to rotate in a clockwise direction with respect to the rotator 21 around the link axis 41, when the rotator 21 is rotated in an anti-clockwise direction.

Figure 6B:
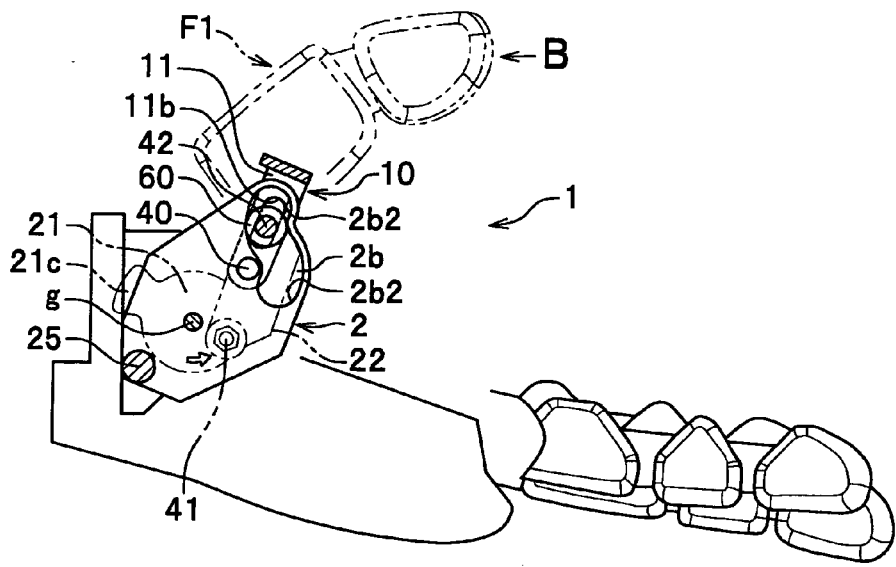
FIG. 6B is an explanatory view showing the robot hand apparatus, which is looked from the cross-section along line VI-VI in FIG. 3, and in which the finger is positioned between flexed-position and stretched-position.
Figure 6C:
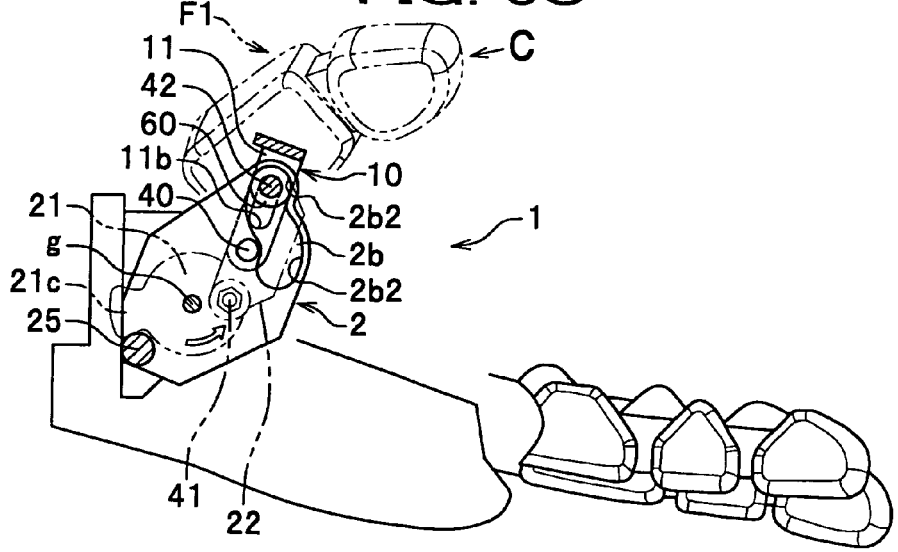
FIG. 6C is an explanatory view showing the robot hand apparatus, which is looked from the cross-section along line VI-VI in FIG. 3, and in which the finger is in a stretched-position.

In this occasion, since the bearing 60 disposed on the control axis 42 moves upward along the first guide hole 2b1 of the second guide path 2b due to a torque of the connection link 22, the posture is changed to the posture B shown in FIG. 5B and FIG. 6B.

Here, since the second guide hole 2b2 is formed along the circular arc equidistant from the rigid axis 40, the position within the guide long hole 11b of the control axis 42 does not change relatively.

That is, since the supporting point (rigid axis 40) of the rotation of the first link 10 is fixed to the base 2, and the direction of the guide long hole 11b crosses the direction of the first guide hole 2b1, the leg 11 (first link 10) is rotated to a direction standing the leg 11 (first link 10).

Additionally, due to anti clockwise direction's rotation of the first link 10, the finger link F1 supported by the finger link F1 is also rotated in an anti clockwise direction, which is a direction apart from the palm, around the first axis S1, as the supporting point.

Next, in posture B of FIG. 5B and FIG. 6B, the bearing 60 provided on the control axis 42 slides upward due to a torque of the connection link 22, when the rotator 21 is still rotated to an anti clockwise direction. Then, the control axis 42 comes in contact with the tip of the guide long hole 11b and thus the posture is changed to the posture B shown in FIG. 5C and FIG. 6C.

In this occasion, since the second guide hole 2b2 is formed along a direction separating from the rigid axis 40, the position within the guide long hole 11b of the control axis 42 changes so that the control axis 42 gradually separate from the rigid axis 40. That is, in the posture B, since the direction of the second guide hole 2b2 and the direction of the guide long hole 11b agree with each other, further rotation of the first link 10 leg 11 in an anti clockwise direction is forbidden. Thus, the elevating member 30 connected to the connection link 22 is lifted under the guide of the guide plate 13 and 14.

In this occasion, as shown in FIG. 7, the arm member 31 disposed on the elevating member 30 is pushed upward, and thus the finger link F1 is pushed upward through the supporting point disposed inside with respect to the connection pin 45. Thus, the finger link F1 is rotated to an outside around the connection pin 45 which serves as the supporting point. That is, the finger link F1 rotates around the second axis S2.

In the present embodiment, additionally, a protruding part 25 is formed on the base 2 so that the protruding part 25 intersects with a rotation locus of the protrusion 21c disposed on the rotator 21. The protruding part 25 contacts with the protrusion 21c of rotator 21 when the posture is changed to the posture C of FIG. 5C and FIG. 6C, and the protruding part 25 forbids the further rotation in an anti clockwise direction of the rotator 21.

When changing the posture of the finger link F1 to the posture A from the posture C, on the contrary, the elevating member 30 moves downward between the guide plate 13 and the guide plate 14 while supporting the control axis 42 by the guide long hole 11b and the second guide hole 2b2, by rotating the rotator 21 in an anti clockwise direction under the posture C.

Thereby, the finger link F1 is rotated to an inside direction around the connection pin 45, which serves as the supporting point (see FIG. 2), and thus the posture is changed to the posture B. Then, the first link 10 is flexed around the first axis S1, which serves as the supporting point, under the guide of the guide long hole 11b and first guide hole 2b1, by rotating the rotator 21 in a clockwise direction. Thereby, the finger link F1 is flexed to a direction approaching to a palm.

As described above, in the robot hand apparatus 1 of the present embodiment, the actuation of the finger link F1 around each of the first axis S1 and the second axis S2 is enabled. Therefore, the number of the parts can be reduced, and the reduction of the apparatus's weight can be enabled. Furthermore, since the weight at tip of the arm R3 can be reduced, the decreasing of the moment of inertia can be achieved.

In the present embodiment, additionally, as shown in FIG. 4, since the slide within the second guide path 2b of the bearing 60 is enabled by providing the bearing 60 to the control axis 42, the smooth actuation of the finger link F1 can be constantly achieved. Additionally, the adoption of the bearing 60 enables much smooth actuation of the finger link F1 and the smooth actuation at the inflexion point between the first guide hole 2b1 and the second guide hole 2b2.

Still furthermore, since the connection link 22 and the elevating member 30 are joined through the control axis 42, the reducing of the number of the parts can be achieved. Here, the connection link 22 and the elevating member 30 may be joined using the other axis other than the control axis 42.

Figure 8A:
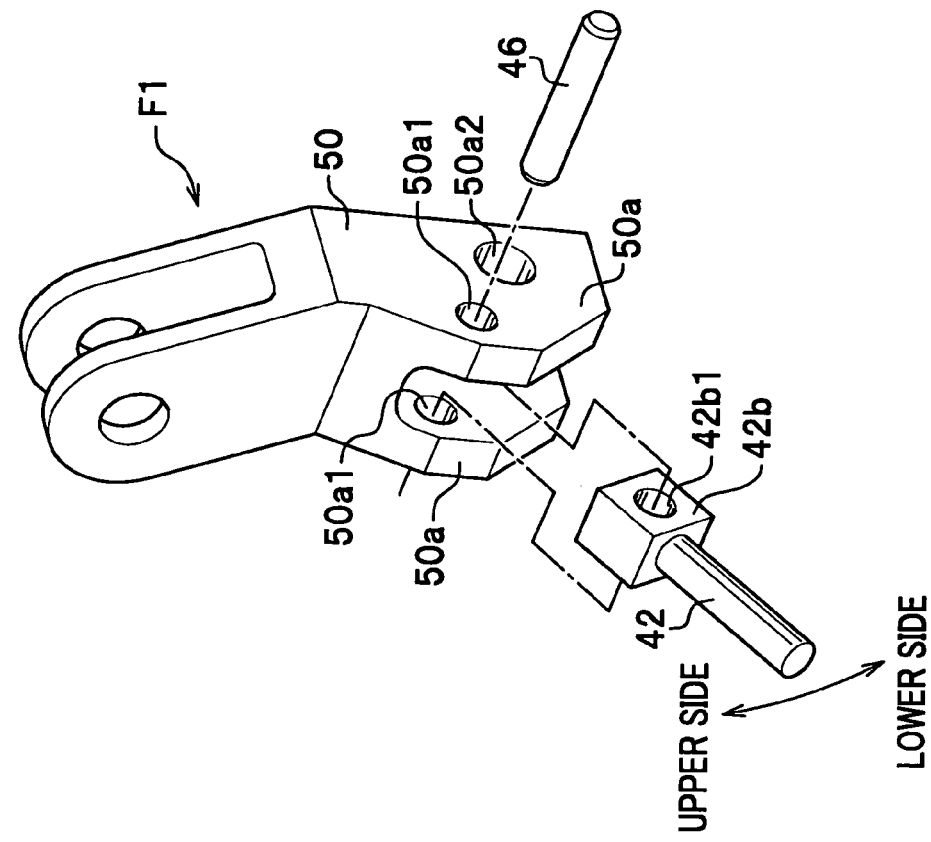
FIG. 8A is a perspective view showing the mechanism wherein the first link is directly linked with the finger link.
Figure 8B:
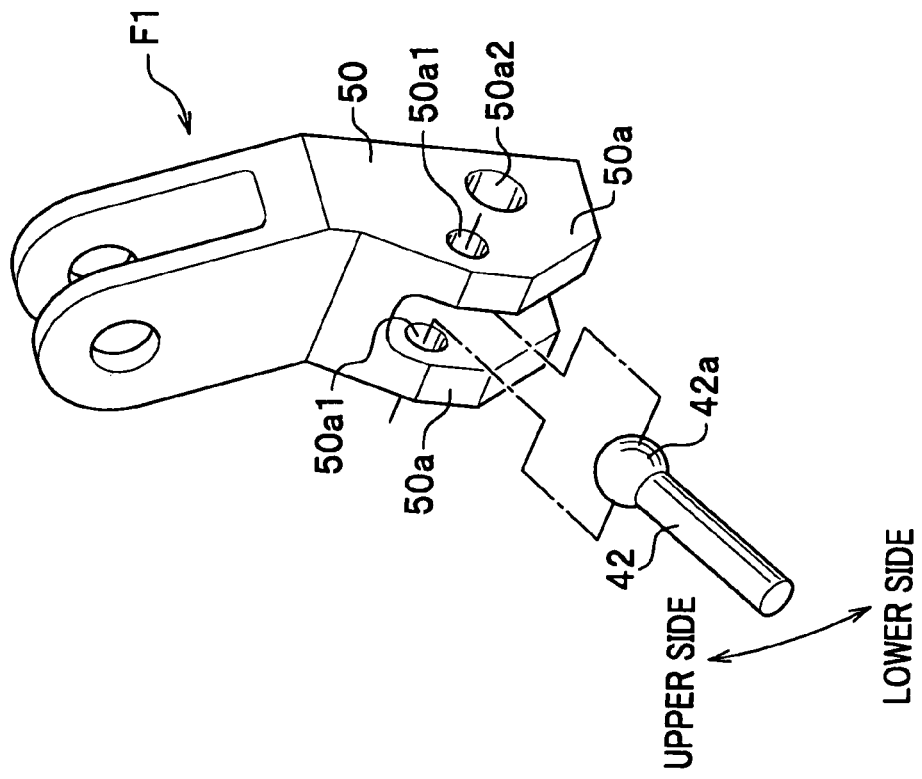
FIG. 8B is a perspective view showing the mechanism wherein the first link is directly linked with the finger link.

FIG. 8A and FIG. 8B are respectively a perspective view showing the mechanism linking directly the first link and the finger link. In this embodiment, the finger link F1 of each mechanism is directly actuated by a torque of the control axis 42, and is not indirectly actuated by a torque of the control axis 42 that is transferred through the arm member 31 and the elevating member 30.

Here, as for the other sections which are not indicated in figure, it is regarded as the same as the above described embodiment, and the explanation thereof will be omitted.

In the embodiment shown in FIG. 8A, by providing the sphere 42a at the tip of the control axis 42, the sphere 42a is rotatably engaged with the pin connection holes 50a1 and 50a1 disposed on the finger link F1. In the case of the embodiment shown in FIG. 8B, a coupling 42b, to which pin insertion hole 42b1 is formed, is provided to the tip of the control axis 42, and the coupling 42b rotatably connects with the pin connection holes 50a1 and 50a1 through a pin 46.

Here, in the case of FIG. 8A, the pin connection hole 50a1 is not always a through hole, and this pin connection hole 50a1 may be a bottomed hole.

As for both embodiments shown in FIG. 8A and FIG. 8B, the finger link F1 is rotated around the connection hole 50a2 (the second axis S2), which serves as a supporting point, by the up-and-down directional movement of the control axis 42 that is caused in accordance with the actuation of the connection link 22 (not shown). By directly actuating the finger link F1 by the control axis 42, the omission of the elevating member 30 and the arm member 31 is enabled. Thereby, further reducing of the number of the parts can be enabled.

FIG. 9 is a schematic view showing robot hand apparatus 1A, in which the second link is simplified. FIG. 9A indicates the motion around a first axis, and FIG. 9B indicates the motion around a second axis.

As shown in FIG. 9A, the robot hand apparatus 1A has a first link 10A, a second link 20A, and a finger link F1.

The first link 10A has a guide long hole 11c (first guide path) and is rotatable around the rigid axis 40A disposed on the base (not shown). Additionally, the finger link F1 rotatably connects with the first link 10A through the connection pin 45A.

One end of the second link 20A is supported by the actuation shaft g and is allowed the rotation around the actuation shaft g, and the other end thereof is fixed to the control axis 42A, which is inserted into the guide long hole 11c so that the control axis 42A is moveable along the guide-long-hole 11c.

Additionally, as shown in FIG. 9B, the control axis 42A rotatably connects with the finger link F1 through the elevating member 30A.

In the robot hand apparatus 1A, as shown in FIG. 9A, since second link 20A rotates in an anti clockwise direction by the torque of the actuation shaft g, the control axis 42A moves within the long guide hole 11c of the first link 10A from one end to the other end.

Thereby, the finger link F1 is rotated around the rigid axis 40A which serves as first axis, and is moved to the position shown by dot dash line. That is, the finger link F1 is actuated as if a thumb moves to the position where a thumb is directed upwardly.

In this occasion, as shown in FIG. 9B, the finger link F1 is pushed upwardly by the elevating member 30A in compliance with the torque during the upward movement of the control axis 42A. Thus, the finger link F1 is rotated around the connection pin 45A, which serves as second axis, and is moved to the position shown by dot dash line. That is, the finger link F1 is actuated as if a thumb moves to the position where a thumb is directed to an outside.

Here, the present invention is not limited to the above described embodiments, and the shape of the second guide path 2b may be changed as appropriate. As described above, the second guide path 2b is not limited to the second guide path consisting of the curved first guide hole 2b1 and the straight second guide hole 2b2. The shape of the second guide path 2b may be straight or curves as a whole.

In the above described embodiment, the mechanism, in which the rigid axis 40, pins 43 and 44, and the connection pin 45 are used, is adopted for each connection mechanism, i.e. the connection mechanism between the base 2 and the first link 10; the connection mechanism between the elevating member 30 and the arm member 31; the connection mechanisms between the arm member 31 and the finger link F1; and the connection mechanism between the first link 10 and the finger link F1. Two joining members may be joined each other by rotatably connecting a concave portion and a convex portion which are provided on two joining members.

What is claimed is:

1. A robot hand apparatus comprising:
a base;
a motor fixed to the base;
a first link which is supported by the base while allowing a rotation around a first axis and which has a first guide path in which a control axis is movable, the first axis is in parallel to an actuation axis of the motor and is positioned apart from the actuation axis;
a second link which connects with the actuation axis of the motor and supports the control axis, and which moves the control axis within the first guide path in accordance with a rotation of the actuation axis of the motor; and
a finger link which is supported by the first link while allowing a rotation around a second axis crossing the first axis, the finger-link directly or indirectly connects with a control axis so that the finger-link is rotated around the second axis in accordance with the actuation of the control axis.

2. A robot hand apparatus according to claim 1, wherein the base has a second guide path within the moveable range of the first guide path, and
the second link includes:
a rotator fixed to the actuation axis; and
a connection link which is rotatably supported by the rotator and supports the control axis.

3. A robot hand apparatus according to claim 2, wherein the second guide path is formed by connecting a first guide hole, which elongates in a direction around a circumference of the first axis, and a second guide hole, which elongates in a direction of a radius of the first axis.

4. A robot hand apparatus according to claim 3, wherein the first guide hole guides the control axis in a circumference direction around the first axis, and
the second guide hole guides the control axis in a radial direction with respect to the first axis.

5. A robot hand apparatus according to claim 3, wherein the control axis is adapted to slide within the first guide hole and the second guide hole.

6. A robot hand apparatus according to claim 5, wherein a protrusion, which contacts with a protruding part provided on the base and controls the rotation of the rotator, is provided on the rotator, and
the position where the protrusion is provided is the position opposite across the position where the actuation axis is fixed to with regard to the position where the connection link is supported to.

7. A robot hand apparatus according to claim 3, wherein the first guide path is a long hole which elongates in a direction of a radius of the control axis.

8. A robot hand apparatus according to claim 7, wherein the elongation direction of the first guide path agrees with the elongation direction of the second guide hole of the second guide path when the finger link is rotated around the second axis.

9. A robot hand apparatus according to claim 8, wherein a lifting member, which connects with the control axis and moves together with the control axis when the control axis moves along the second guide path, is provided to the connection link, and
the lifting member is provided with an arm member which rotatably connects the finger link and rotates the finger link around the second axis.

10. A robot hand apparatus according to claim 2, wherein the position where the connection link is supported by the rotator is an eccentric position with respect to the position where the actuation axis is fixed to the rotator.

* * * * *